United States Patent [19]

Makishima

[11] Patent Number: 5,727,592
[45] Date of Patent: Mar. 17, 1998

[54] PIPE CONNECTOR

[75] Inventor: Reichi Makishima, Tokyo, Japan

[73] Assignee: Nitto Kohki Co., Ltd., Japan

[21] Appl. No.: 771,063

[22] Filed: Dec. 20, 1996

[30] Foreign Application Priority Data

Apr. 17, 1996 [JP] Japan ...................... 8-094960

[51] Int. Cl.$^6$ ..................................... F16L 37/28
[52] U.S. Cl. ................... 137/614.05; 285/124.1; 285/358
[58] Field of Search ............... 137/614.05, 614.04, 137/614.03; 285/124.1, 312, 314, 358

[56] References Cited

U.S. PATENT DOCUMENTS

| 3,710,823 | 1/1973 | Vik | 285/124.1 X |
| 5,464,042 | 11/1995 | Haunhorst | 137/614.04 X |

FOREIGN PATENT DOCUMENTS

| 53-7833 | 1/1978 | Japan. |
| 62-110687 | 7/1987 | Japan. |
| 2-91297 | 7/1990 | Japan. |
| 7-35282 | 2/1995 | Japan. |

Primary Examiner—Kevin Lee
Attorney, Agent, or Firm—Nixon & Vanderhye

[57] ABSTRACT

A pipe connector comprises sockets each having a rear cylindrical member connected to an associated one of first pipes, plugs each having a plug body connected to an associated one of the second pipes, and a locking mechanism, provided on each socket, for locking the associated plug. The pipe connector further comprises an inner cylindrical member having a plurality of housing sections for housing the rear cylindrical members, and a coupling portion for coupling the housing sections, and a main cylindrical member, extending in the axial direction of the housing sections, for movably containing the housing sections. The coupling portion and the main cylindrical member have a pair of holes formed to correspond to each other, one of the pair of holes having a tapered surface inclined with respect to the axial direction. The other of the pair of the holes contains a cam member. When the plug body is locked to the associated socket by the locking mechanism, the cam member is externally driven to cooperate with the tapered surface, thereby moving the main cylindrical member and the inner cylindrical member relative to each other in the axial direction of the housing sections and bringing the plug body and rear cylindrical member into contact with each other in the axial direction thereof.

10 Claims, 10 Drawing Sheets

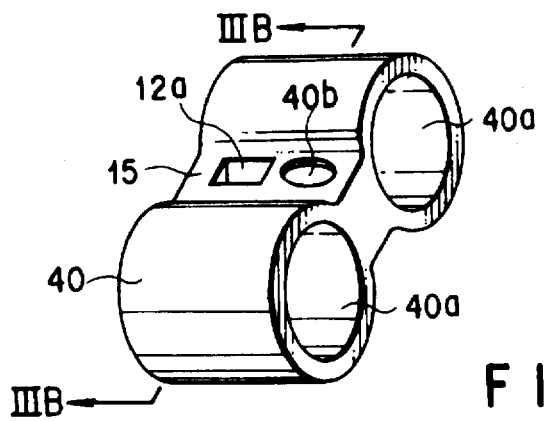
F I G. 3A
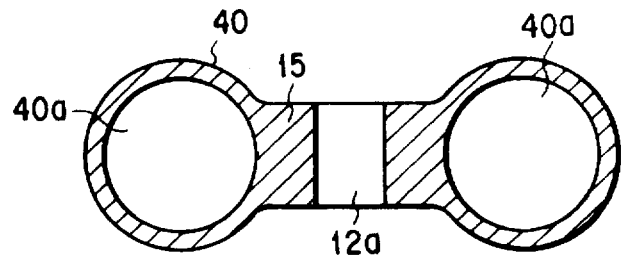
F I G. 3B
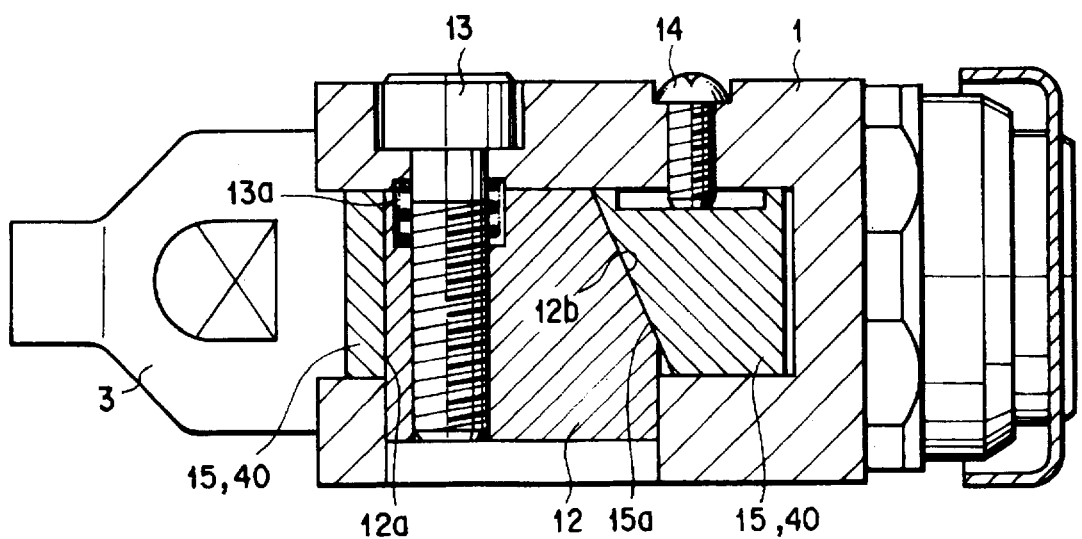
F I G. 4

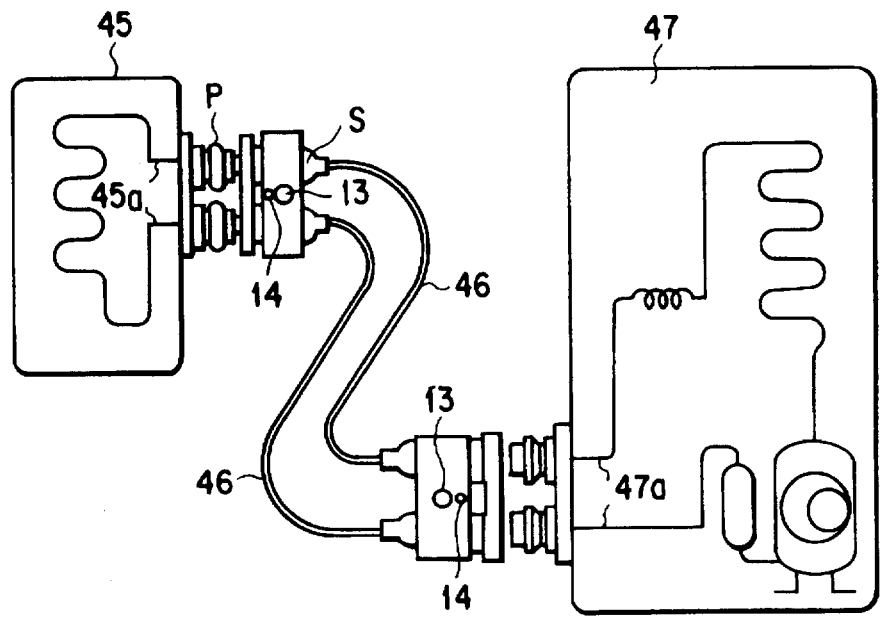
F I G. 8

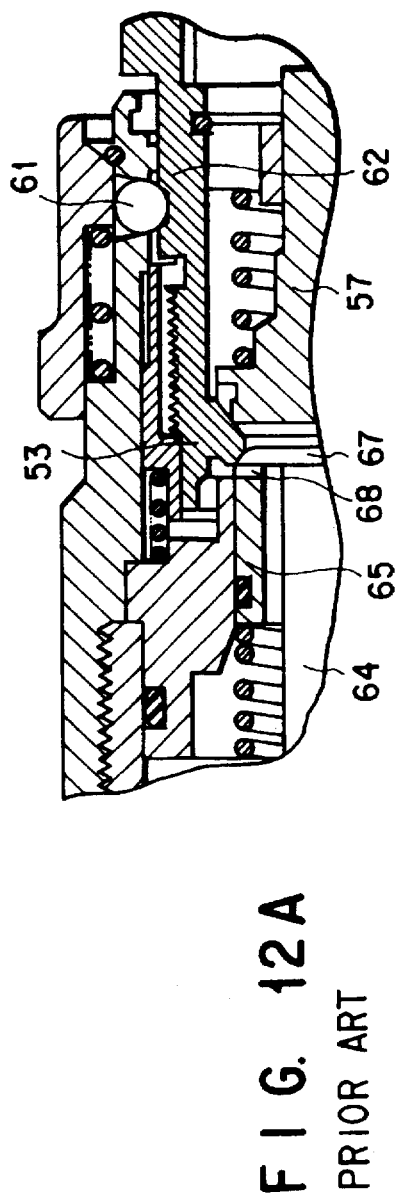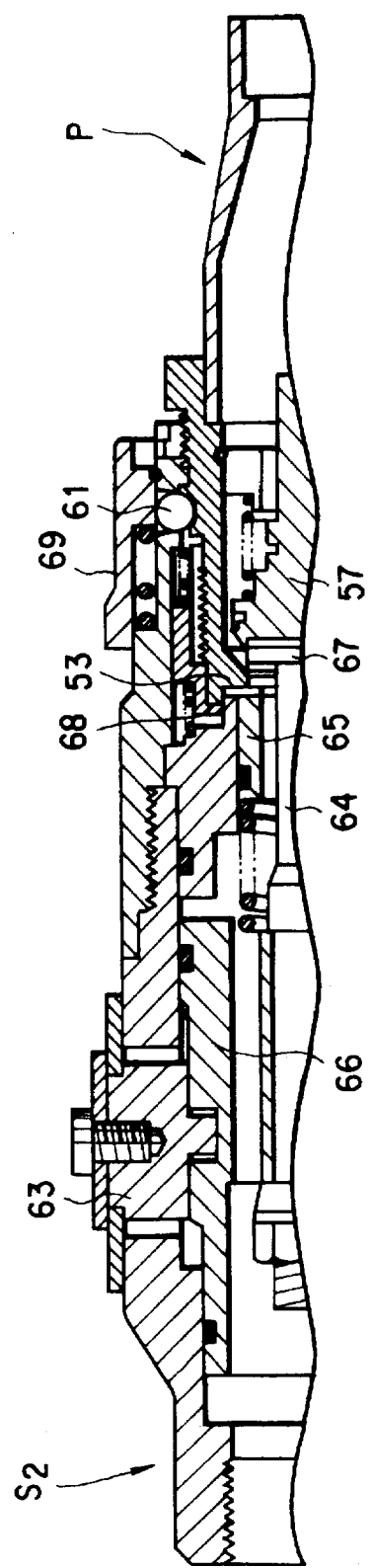
FIG. 12A PRIOR ART
FIG. 12B PRIOR ART

PIPE CONNECTOR

BACKGROUND OF THE INVENTION

The present invention relates to a pipe connector for suitable use in piping of, in particular, cooling apparatuses or air conditioners.

Various types of pipe connectors have conventionally been known, which are used in piping of cooling apparatuses or air conditioners. For example, the structure of a pipe connector, as disclosed in Jpn. Pat. Appln. KOKAI Publication No. 53-7833, will now be described in brief with reference to the accompanying drawings.

In this pipe connector, as shown in FIG. 10, a plug P is connected commonly to a socket S1 (first socket) having a union nut 51 and functioning as union joint and to a socket S2 (second socket) having a ball lock mechanism and functioning as a simplified joint.

The plug P and first socket S1 are provided, for example, on indoor and outdoor units of a cooling/heating air conditioner, or on connecting pipes thereof. The second socket S2 is provided, for example, on a nitrogen gas cylinder, a vacuum pump or a gas-filling Freon gas cylinder for use in leak/pressure-resistance tests.

When the plug P and first socket S1 are to be connected, the front portions of the plug P and socket S1 are made to face each other, as shown in FIGS. 10 and 11, and then a external threaded portion 52 of the plug P is meshed with a internal thread portion of a union nut 51 formed in the socket S1. If the union nut 51 is further rotated, an annular portion 53 of plug P comes into contact with a slide valve 54 of the socket S1. The slide valve 54 is retreated against the urging force of a spring 55. While a flow passage is being opened, a valve body 56 of the socket S1 pushes a valve body 57 of the plug P. Thus, the flow passage of the plug P communicates with that of the socket S1. By the final rotation of the union nut 51, a sealing edge 58 bites into sealing faces of the plug P and socket S1, thereby effecting a metal-to-metal fluid seal.

On the other hand, when the plug P is to be connected to the second socket S2, the plug P is inserted into the opening of the second socket S2 and then locking balls 61 of the socket S2 are engaged in a peripheral groove 62 in the plug P, as shown in FIGS. 10, 12A and 12B. In this state, the valve body 57 of plug P and a valve rod 64 of socket S2 do not form a fluid passage and the fluid passage in the socket S2 does not communicate with that of the plug P. Then, an operating lever (not shown) is actuated to rotate a cam 63. The cam 63 rotates to advance a valve holder 66 holding the valve rod 64. With the advancement of the valve holder 66, the annular portion 53 of plug P comes into contact with a sealing member 68 provided on the advancing slide valve 65 of socket S2, as shown in FIG. 12A. In the state shown in FIG. 12A, a fluid seal is effected. If the cam 63 is further rotated, the valve rod 64 alone is advanced while the slide valve 65 remains in contact with the annular portion 53 of plug P. A valve head 67 pushes back the valve body 57 of plug P, thereby opening the fluid passage of plug P, as shown in FIG. 12B.

In the above pipe connector, the second socket connected to a nitrogen gas cylinder and the unit-side plug are connected at the time of testing the leak/pressure-resistance of the indoor/outdoor units of the air conditioning apparatus. After the connection is effected, the operating lever of the second socket is actuated to slide the valve rod and to retreat the valve body of the plug, thereby making the fluid passages of the second socket and plug communicate with each other. Thus, the productivity of this pipe connector is higher than that of a conventional pipe connector using a union nut. In addition, when an air conditioning apparatus is disposed for household use, the plug and the first socket are connected by using a union nut.

Apart from the above pipe connector, the applicant of the present invention proposed a pipe connector capable of simultaneously connecting two gas pipes, etc. for enhancing the efficiency of a pipe connection work (Jpn. U.M. Appln. KOKAI Publication No. 62-110687).

The pipe connector disclosed in Jpn. Pat. Appln. KOKAI Publication No. 53-7833, however, has the following problem.

When the first socket and the plug are to be connected, it is necessary to tightly fasten the union nut of the first socket in the final stage. At this time, the sealing member for maintaining a seal of the first socket and plug may rotate along with the union nut and the sealing member may be twisted, resulting in breakage of the sealing member or defective sealing.

Besides, if a sleeve provided on the second socket is erroneously operated while the second socket is connected to the plug, the second socket may be separated from the plug. Specifically, sleeve 69 is retreated against the urging force of the spring in the connection state shown in FIG. 12B, the plug P can be easily separated from the socket S. Besides, in the sealing structure wherein the operating lever is rotated to advance the valve holder by means of the cam, thereby bringing the sealing member into contact with the annular portion of the plug P, the force for fastening the sealing member may weaken and gas may slightly leak from the connection portion. With the socket S2 of this structure, it is difficult to maintain the communication state of the fluid passage for a long period of time. This pipe connector, therefore, is not satisfactory to adopt.

The pipe connector of Jpn. U.M. Appln. KOKAI Publication No. 62-110687 is advantageous in that the connector can connect two gas pipes at the same time and the workability is enhanced. However, the sealing properties, etc. are not satisfactory as a connector for connecting two gas pipes for high-pressure gas and low-pressure gas in an air conditioning apparatus.

BRIEF SUMMARY OF THE INVENTION

The object of the present invention is to provide a pipe connector with high sealing properties, capable of connecting a socket and a plug without causing a twist, etc. of a sealing member, provided between the socket and plug, for maintaining the sealed state thereof. When the socket is made to communicate with the plug, the socket and plug are locked in the connection state. Even if the sleeve is erroneously operated, the socket is never separated from the plug. In addition, the pipe connector can connect two integrated pipes at a time, such as a high-pressure gas pipe and a low-pressure gas pipe, and has high workability. Furthermore, leak/pressure-resistance tests can be conducted with use of an O-ring alone by adjusting a cam, without using a metallic seal.

The present invention relates to a pipe connector capable of detachably coupling sockets and plugs. Main cylindrical members of the sockets are provided with a plurality of front cylindrical members each having a locking mechanism. Inner cylindrical members containing rear cylindrical members disposed coaxial with the front cylindrical members are disposed in the main cylindrical members. Communication holes are formed in the inner cylindrical members and main cylindrical members, and cams are disposed in the communication holes. By actuating the cams, the main cylindrical members and the inner cylindrical members are moved relative to each other.

Furthermore, valve mechanisms are provided in the sockets and plugs of the pipe connector.

The present invention has mainly four advantages: 1) The socket-side valve mechanism can be advanced by using a cam, thereby firmly abutting the plug upon the sealing member and metallic seal. Thus, the sealing member or metallic seal is not twisted while it is being fastened, unlike a conventional pipe connector in which a socket and a plug are connected while a union nut is being fastened. 2) Even if the socket-side sleeve is operated in the state in which the flow passages of the socket and plug communicate with each other, the socket and plug are not disconnected since the sleeve is locked by the socket and plug. 3) When the socket and plug are connected, there is no need to perform such time-consuming works as fixing both the socket and plug by means of tools and rotating a union nut of one of them. 4) Since the metallic seal is pressed by the screw and cam, leakage is prevented for a long time from the flow passages of the socket and plug.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A and FIG. 3B are a perspective view and a cross-sectional view of an inner cylindrical member of the pipe connector according to the present invention;

FIG. 4 is a cross-sectional view taken along line IV—IV in FIG. 1;

FIG. 8 schematically shows the piping of a cooling/heating air conditioner using the pipe connector of this invention;

FIGS. 12A and 12B are explanatory views showing another connection state of the conventional pipe connector.

DETAILED DESCRIPTION OF THE INVENTION

Figure 1:
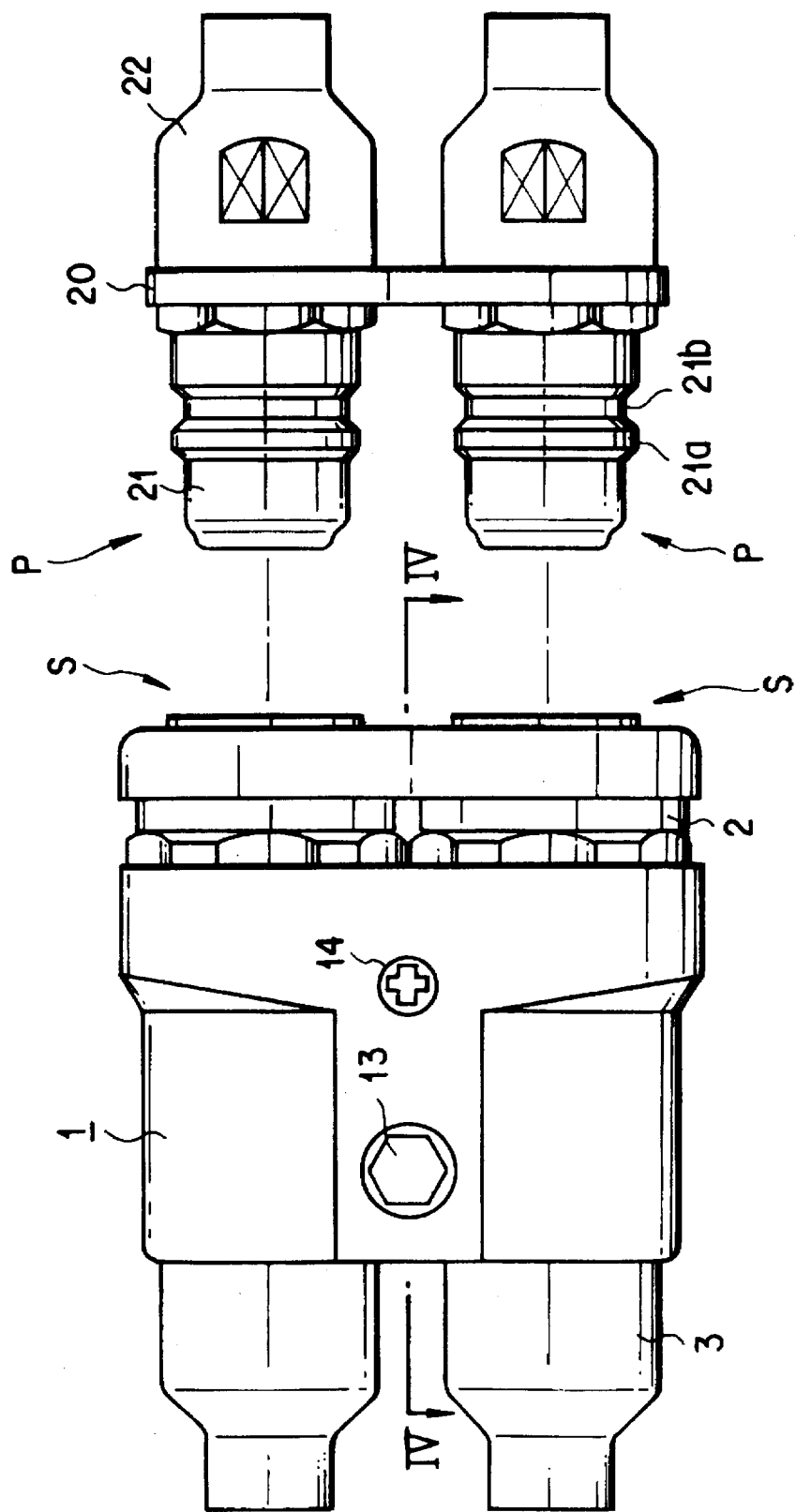
FIG. 1 is a plan view schematically showing a socket and a plug of a pipe connector according to an embodiment of the present invention.

FIG. 1 shows a pipe connector according to the present invention. The pipe connector comprises a female unit, in which two sockets S are integrated as one body, and a male unit, in which two plugs P are integrated as one body, so that two pipes can be connected at a time. Two pipes can be connected at a time by connecting the plugs P with the sockets S. The two sockets S have the same structure, and the two plugs of the integrated plug P also have the same structure.

The structures of the socket S and plug P will now be described in detail.

Figure 2:
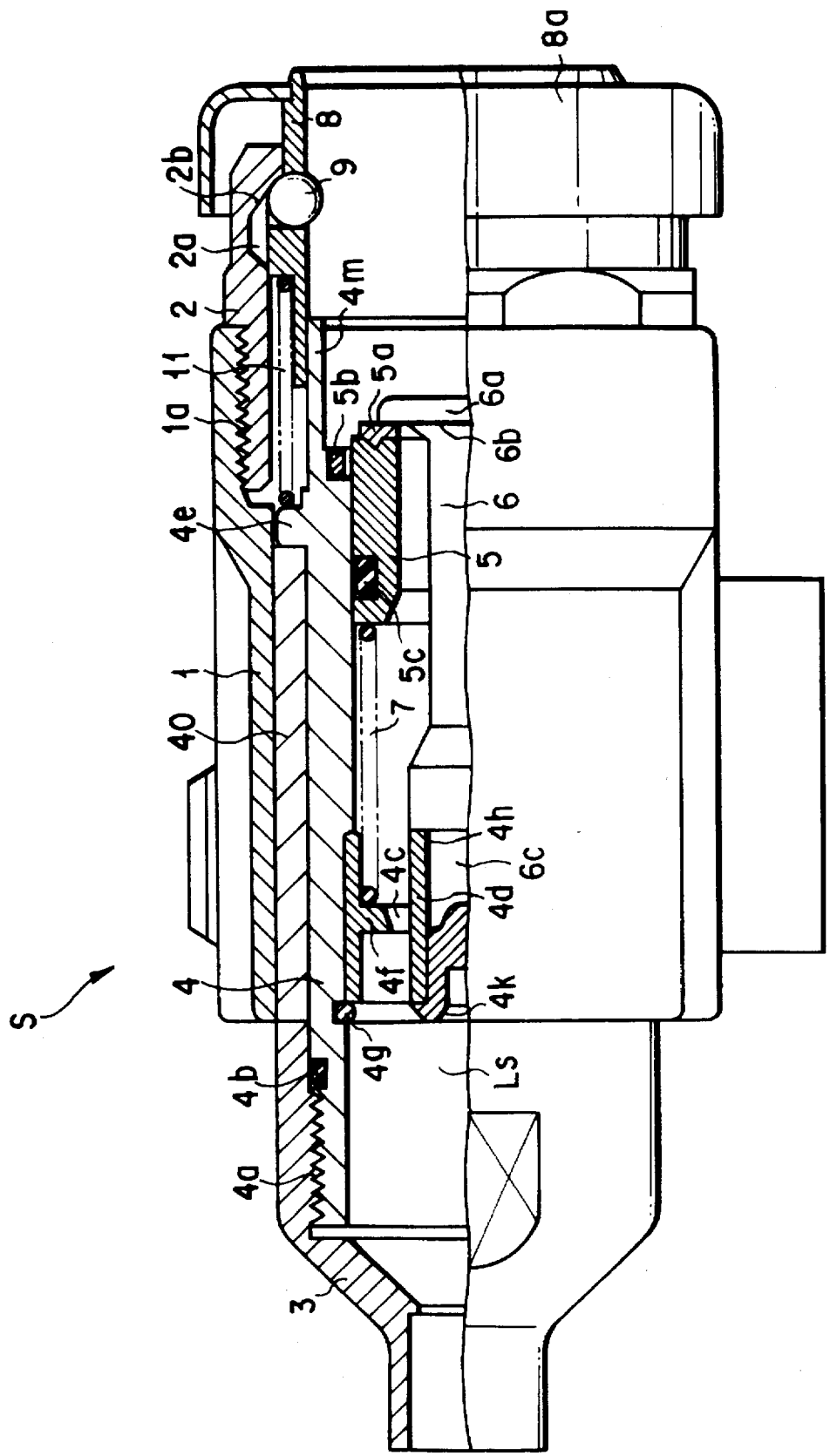
FIG. 2 is a partial cross-sectional view of the socket of the pipe connector according to the embodiment of the invention.

In FIG. 2, the socket S has a main cylindrical member 1. A front cylindrical member 2 having a locking mechanism is fixed by means of a screw 1a to a front end portion of the socket S to be connected to the plug P. A circumferential groove 2a for shifting locking balls 9 radially outward is formed in an inner peripheral surface of the front cylindrical member 2. A ball holding cylindrical member 8 for holding the locking balls 9 is slidably provided on the inner periphery of the front cylindrical member 2. A sleeve 8a is integrally fixed to the ball holding cylindrical member 8. The ball holding cylindrical member 8 is constantly urged to the right in FIG. 2 by a spring 11 disposed between the ball holding cylindrical member 8 and a spring receiving portion 4e of a rear cylindrical member 4 (to be described later). Thus, a locking mechanism is constituted so as to keep the locking balls 9 from being pushed radially inward along an inclined surface 2b of the circumferential groove 2a.

An inner cylindrical member 40 containing the rear cylindrical members 4 is slidably disposed within the main cylindrical member 1. The inner cylindrical member 40 is clamped between the spring receiving portions 4e of rear cylindrical members 4 and connection pipes 3 screwed on end portions of the rear cylindrical members 4. The inner cylindrical member 40 and the rear cylindrical members 4 may be integrally formed as one body. The inner cylindrical member 40 has an outer shape and a cross section, as shown in FIGS. 3A and 3B. A pair of housing portions 40a for housing the rear cylindrical members 4 are juxtaposed. A central portion between the housing portions 40a has a communication hole 12a for vertically movably containing a cam 12 (to be described later; see FIG. 4) and a stopper groove 40b.

Referring back to FIG. 2, the connection pipe 3 is engaged with the rear cylindrical member 4 by means of a screw 4a. A seal member 4b is disposed between the connection pipe 3 and rear cylindrical member 4. The spring receiving portion 4e formed at the plug-side portion of the rear cylindrical member 4 receives the end portion of the spring 11. The ball holding cylindrical member 8 is slidably fitted on the outer peripheral portion of the plug-side end portion of the rear cylindrical member 4. A plug-side end portion 4m of the rear cylindrical member 4 is engaged with an engaging portion (to be described later) of the plug P, thereby performing the locking mechanism when the socket S and plug P are coupled to each other. Furthermore, the rear cylindrical member 4 is prevented from being loosened or removed from the main cylindrical member 1 by means of a bolt 14 (to be described later) engaged in the stopper groove 40b formed in the inner cylindrical member 40.

A valve claw or retainer 4d having a plurality of passage holes 4c is fixed inside the rear cylindrical member 4 by means of a stop ring 4g. A spring seat 4f is formed at a middle portion of the valve retainer 4d. A fixed end portion 6c of a valve rod 6 is irremovably fixed in a central hole 4h of the valve retainer 4d by means of fixing means such as caulking 4k (FIG. 2 showing a part of the fixed end portion 6c of valve rod 6 in a cut-out cross-sectional view).

A slide ring 5 is slidably held in a plug-side region in the rear cylindrical member 4. A spring 7 for urging the slide ring 5 to the right in FIG. 2 is disposed between the slide ring 5 and the valve retainer 4d. An O-ring 5c is fitted on an outer peripheral portion of the slide ring 5. On the end face side of the slide ring 5, a sealing member 5a, which is put in contact with a valve seat 6b of a head portion 6a formed on the valve rod 6, normally closes a flow passage Ls. A metallic seal 5b is provided on the inner peripheral surface of the plug-(P)-side portion of the rear cylindrical member 4. By virtue of the metallic seal 5b, the sealing between the socket S and plug P can be exactly maintained for a long time, as will be described below. In the present embodiment, a mechanism for sealing the flow passage Ls on the socket (S) side is referred to as "socket-side valve mechanism."

As is shown in FIG. 4, a screw 13 is provided in the main cylindrical member 1 so as to penetrate a central portion 15 of the inner cylindrical member 40. The screw 13 holds the cam 12 vertically movable, thereby opening and closing the valve and sealing the valve by metallic means. A spring 13a urges the cam 12 downward. When the screw 13 is loosened, the cam 12 is separated from a tapered surface 15a of the inner cylindrical member 40 by means of the spring 13a, and the main cylindrical member 1 along with the inner cylindrical member 40 is restored to the original position. On the other hand, the cam 12 is provided with a tapered surface 12b which comes in contact with the tapered surface 15a of the central portion 15 of inner cylindrical member 40. If the screw 13 is rotated to move the cam 12 upward, the tapered surface 12b of cam 12 slides on the tapered surface 15a of the central portion 15 of inner cylindrical member 40. In accordance with the movement of the cam 12, the inner cylindrical member 40 moves to the right in FIG. 4. In addition, the rear cylindrical member 4 fixed to the inner cylindrical member 40 moves to the right, too. By the movement of the rear cylindrical member 4 to the right, the valve rod 6 of socket S pushes a plug-(P)-side valve body 25, thereby causing the flow passage Ls of socket S to communicate with the flow passage Lp of plug P.

Figure 5:
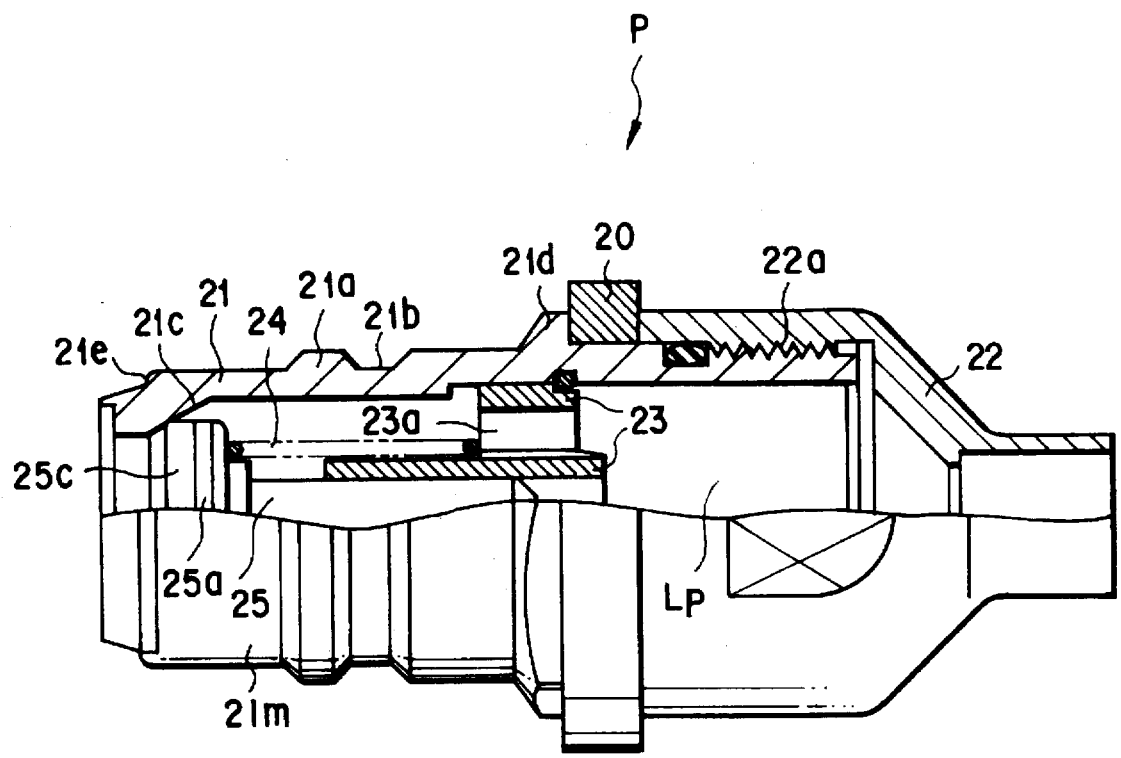
FIG. 5 is a partial cross-sectional view of the plug of the pipe connector according to the embodiment of the invention.

In FIG. 5, two plugs P of the male unit are fixed such that a coupling plate 20 is fitted at flange portions 21d in the middle of the plug bodies 21 and extension pipes 22 are engaged with screw portions 22a formed in the rear parts of the plug bodies 21. The plugs P are provided at distal ends thereof with stepped portions 21e which come in contact with the metallic seals 5b provided on the socket (S) side. A large-diameter portion 21a is formed on a middle portion between the stepped portion 21e and flange portion 21d. An outer peripheral groove 21b for engagement with the locking balls 9 is provided adjacent to the large-diameter portion 21a. A small-diameter portion 21m for engagement with the plug-side end portion 4m of the socket S is formed at the distal end portion of the plug body.

A valve body 25 is slidably held within the plug body 21 by means of a valve claw 23 having a plurality of passage holes 23a and fixed on the plug body 21. A spring 24 for urging the valve body 25 toward a valve seat 21c is provided between a head portion 25a of valve body 25 and the valve claw 23. The head portion 25a is provided with a sealing member 25c. When the plug P is in the non-connection state, the sealing member 25c of head portion 25a is constantly urged on the valve seat 21c. In the state shown in FIG. 5, a flow passage Lp is sealed. In this embodiment, a mechanism for sealing the plug-(P)-side flow passage Lp is called "plug-side valve mechanism."

Figure 6:
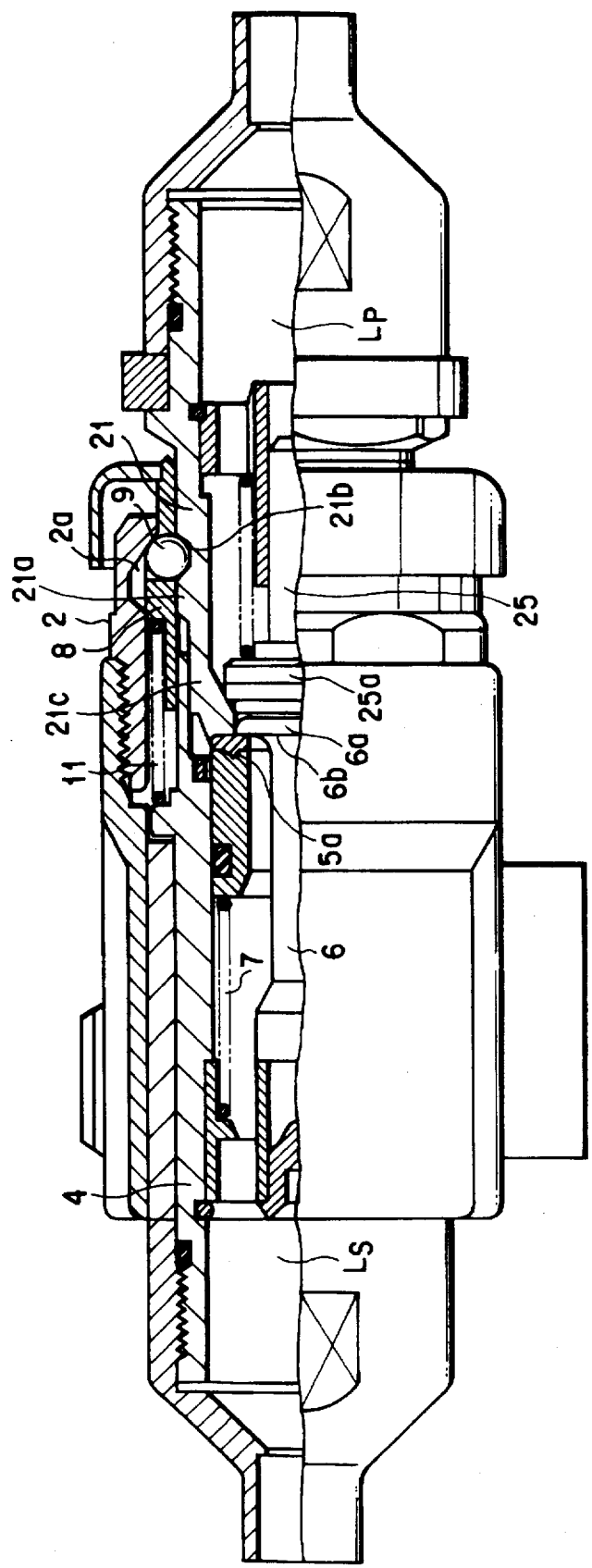
FIG. 6 is a partial cross-sectional view showing the state in which the socket and plug according to the embodiment of the invention are connected, with their flow passages not opened.

The state of connection between the sockets S and plugs P will now be described with reference to FIGS. 6 and 7.

If the plug body 21 is slightly inserted into the front cylindrical member 2 of socket S, one end portion of the large-diameter portion 21a formed on the plug body 21 comes into contact with the locking balls 9. If the plug body 21 is further inserted, the ball holding cylindrical member 8 moves, while holding the locking balls 9, to the left in FIG. 6 against the force of the spring 11. The locking balls 9 enter the peripheral groove 2a formed in the inner periphery of the front cylindrical member 2. When the plug-side outer peripheral groove 21b has come to the position of the locking balls 9, the locking balls 9 are engaged in the outer peripheral groove 21b formed in the plug body 21 by virtue of the urging force of spring 11. Accordingly, the locking balls 9 are pushed radially inward by the functions of the ball holding cylindrical member 8 and front cylindrical member 2. Thus, the socket S and plug P are connected. In this connection state, as shown in FIG. 6, the valve rod 6 provided on the rear cylindrical member 4 and the valve body 25 of plug body 21 face each other and are close to each other in their initial state, and the flow passages Ls and Lp are closed. (Specifically, in the socket S the sealing member 5a is in contact with the valve seat 6b of head portion 6a of valve rod 6, and in the plug P the head portion 25a of valve body 25 is in contact with the valve seat 21c of plug body 21.)

If the screw 13 provided in the main cylindrical member 1 of sockets S is rotated, the cam 12 rises to the position shown in FIG. 4. The main cylindrical member 1 having the front cylindrical members 2 moves relative to the inner cylindrical members 40 having the rear cylindrical members 4 by virtue of the tapered surface 12b of the cam 12 and the tapered surface 15a of communication hole 12a in the central portion 15 of inner cylindrical member 40. The rear cylindrical member 4 moves in the direction of the plug P.

Figure 7:
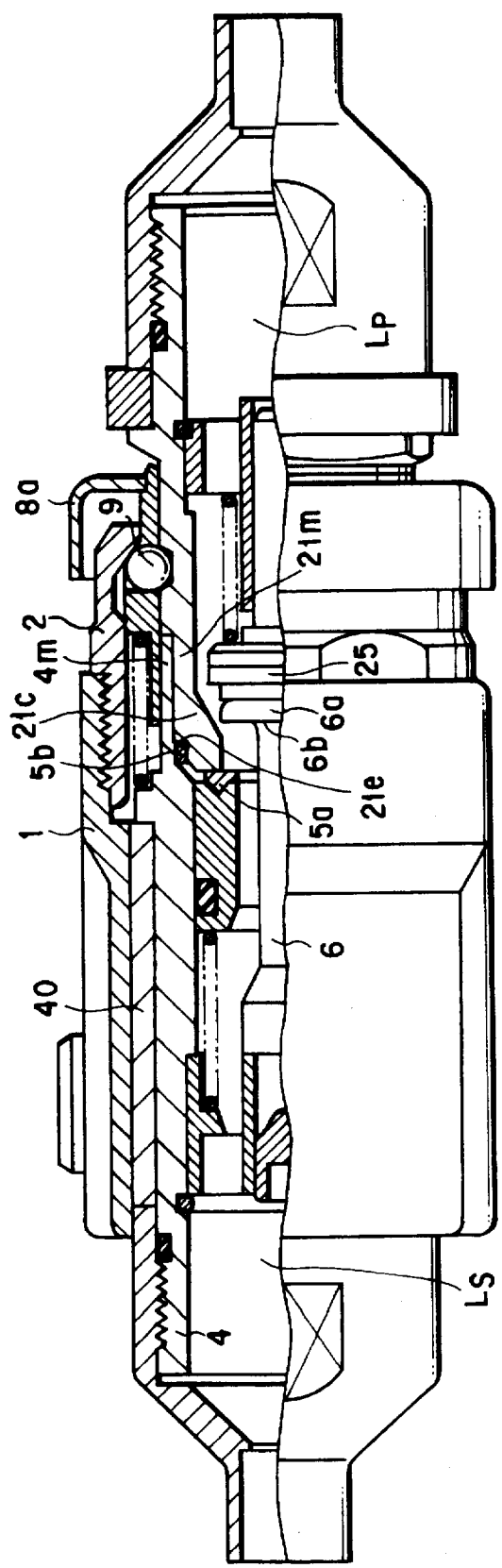
FIG. 7 is a partial cross-sectional view showing the state in which the socket and plug according to the embodiment of the invention are connected, with their flow passages opened.

As a result, as shown in FIG. 7, the end face of the head portion 6a of valve rod 6 moves to the right in FIG. 7 while pushing the end face of the head portion 25a of valve body 25. The sealing member 5a is separated from the valve seat 6b of head portion 6a by the function of the valve rod 6. In addition, the head portion 25a of valve body 25 is separated from the valve seat 21c. Thus, the flow passage Ls of socket S is made to communicate with the flow passage Lp of plug P. In this state, leak/pressure-resistance tests can be conducted and, unlike the prior art, two kinds of pipe connectors need not be used.

If the cam is further raised, the metallic seals 5b provided on the front-side inner peripheries of the rear cylindrical members 4 are strongly pushed by the distal-end stepped portions 21e of the plug bodies 21. As a result, a seal is maintained between the sockets S and plugs P by the function of the metallic seals 5b. Since the metallic seal portions are surely pressed by the screw 13 and cam 12 in this sealed state, the stable sealed state can be maintained for a long time. In the final engagement state (FIG. 7) in which the end portion 4m of rear cylindrical member 4 is put in contact with the end portion 21m of plug body 21 in the axial direction, the movement of the sleeve 8a is limited (i.e. "lock state"). Thus, even if the sleeve 8a is erroneously operated, the sleeve 8a does not move, and the socket S is not disengaged from the plug P.

The present embodiment has the above-described structure. After the sockets S and plugs P are connected, the screw 13 is operated for communication of the flow passages. Thus, even if the backing pressure of the high-pressure sealed gas acts upon the inside valve, the pipe connector can be easily operated, and the valve bodies can be smoothly opened. Furthermore, since the flow passages are opened by using the screw and screw, the connection is not loosened and the sealed state can be maintained stably for a long time. Besides, unlike the prior art wherein the sealing member is pressed by the union nut, the sealing member is not twisted in the final fastening stage.

The above embodiment is directed to the mode in which two pipe systems can be connected at a time. The present invention, however, is not limited to this mode.

An example of piping in which the pipe connector of the present invention is used in a household air conditioning apparatus will now be described in comparison with an example of piping in which a conventional pipe connector is used in a household air conditioning apparatus.

Figure 9:
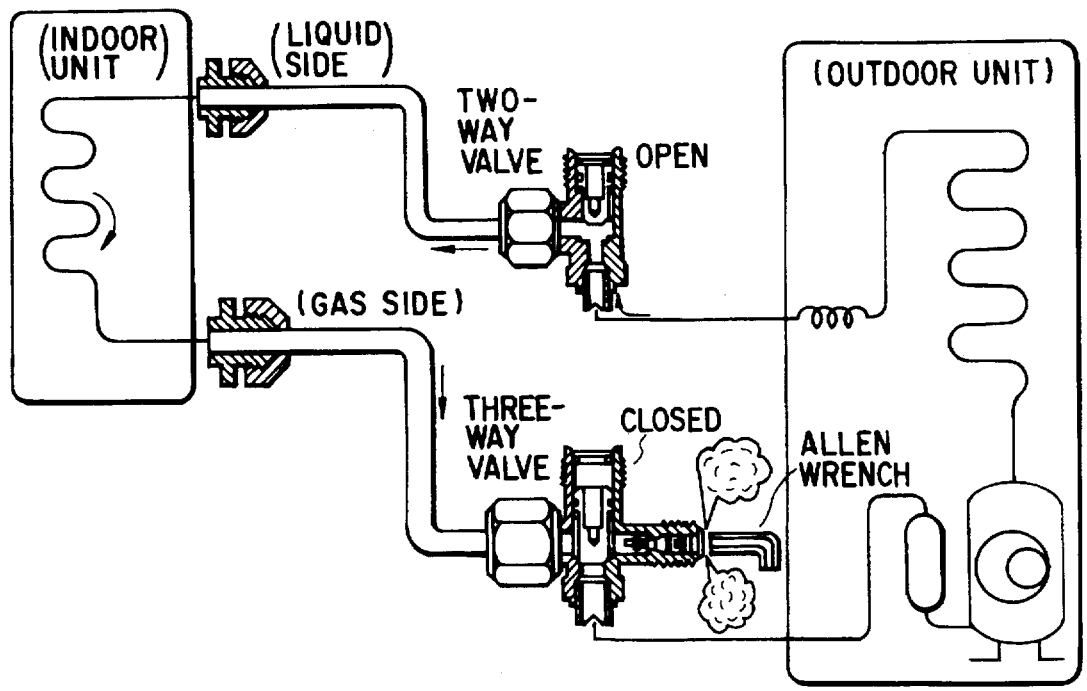
FIG. 9 shows the piping of a conventional cooling/heating air conditioner.
Figure 10:
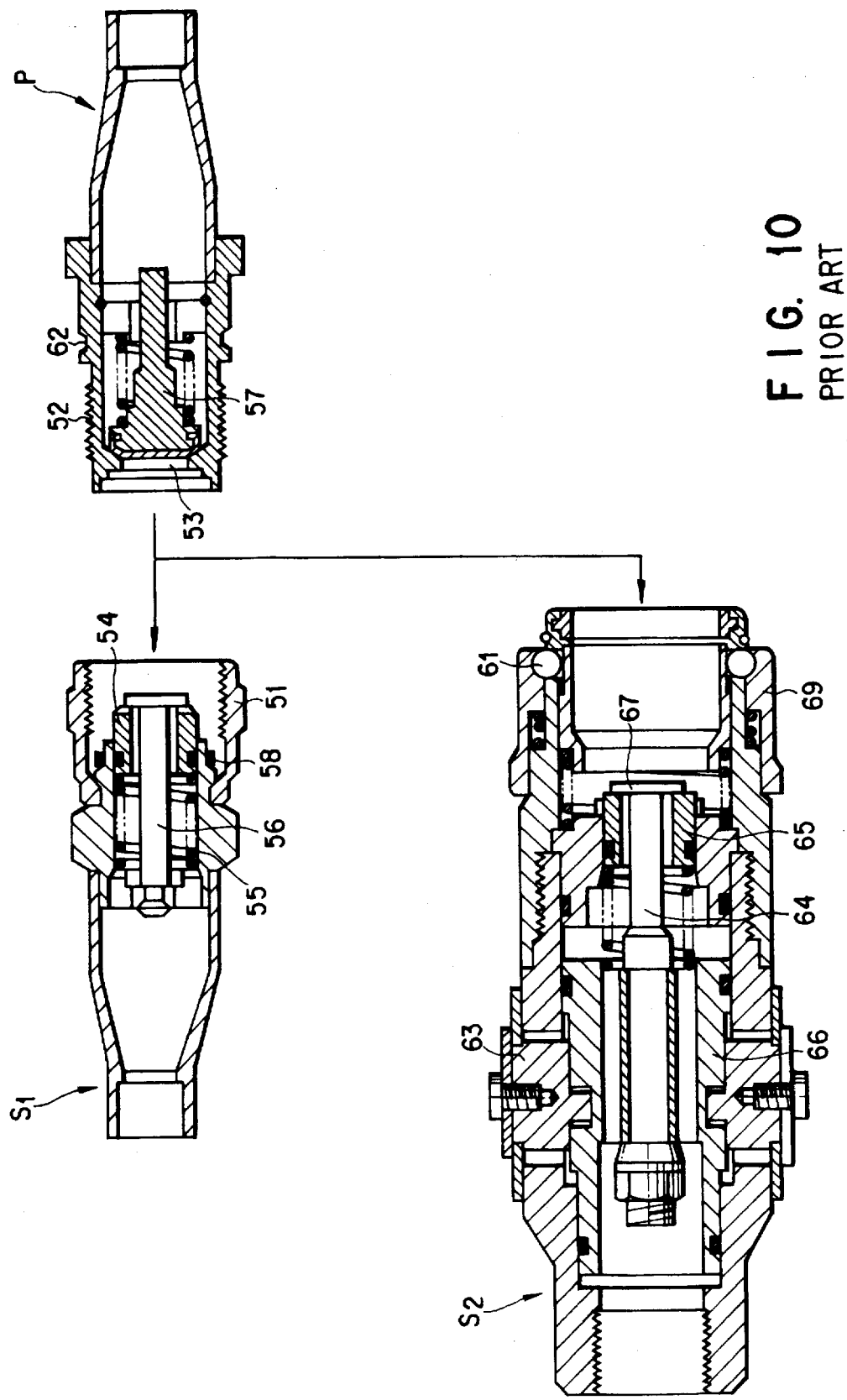
FIG. 10 is an explanatory view of a conventional pipe connector.
Figure 11:
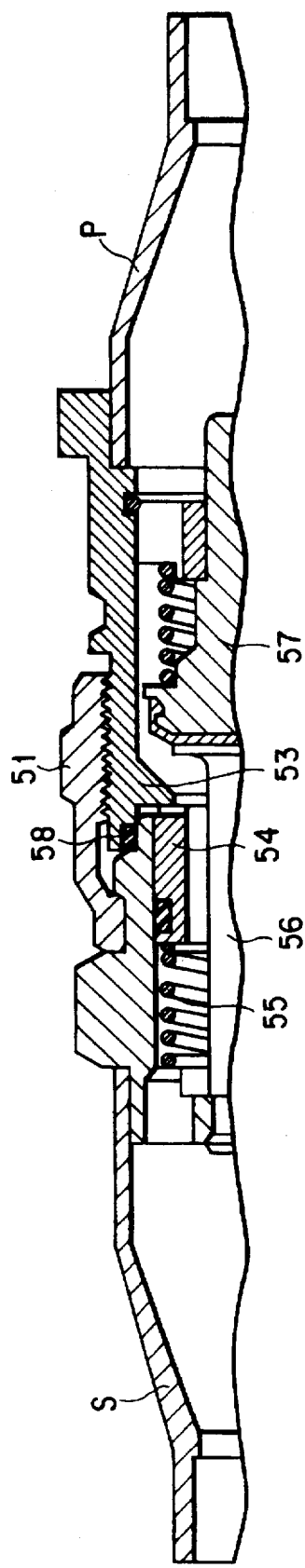
FIG. 11 is an explanatory view showing a connection state of the conventional pipe connector.

In a conventional air conditioning apparatus consigned from a factory, a refrigerant such as Freon is filled in an outdoor unit alone, and an indoor unit and other connection pipes communicate with the outside atmosphere. When the air conditioning apparatus is installed for household use, the air in the indoor unit and connection pipes needs to be purged after the piping is completed, as shown in FIG. 9.

The air purging process will now be described with reference to FIG. 9. At first, a two-way valve is opened for a predetermined time period (about 10 seconds), and a refrigerant in the outdoor unit is fed into a three-way valve through the two-way valve, a liquid-side pipe, the indoor unit, and a gas-side pipe. In this state, gas leak tests are conducted on the pipe connector, etc. After the absence of gas leak is confirmed, the two-way valve is opened once again, and the exhaust side of the three-way valve is opened by means of a hexagonal wrench. Thus, the air in the piping is purged through the two-way valve, liquid-side pipe, indoor unit, gas-side pipe and the exhaust port of the three-way valve. After the air is purged for a predetermined time period, the flow passage of the three-way valve is opened and the gas-side pipe is made to communicate with the outdoor unit. Thereby, the air conditioning apparatus is set in an operable state.

As has been stated above, in the piping work using the conventional pipe connector, the air purge process needs to be performed without fail at the time of installing the cooling/heating apparatus. The air purge work requires professional skill. Consequently, a great amount of expense is needed in the work of installing the cooling/heating apparatus.

As a method of dispensing with such an expensive work of installing the cooling/heating apparatus, it is possible to fill the indoor unit, pipes and outdoor unit with the refrigerant in advance. In conventional pipe connectors, however, it is difficult to maintain the sealing of the piping for a long time. It is thus difficult to consign air conditioning apparatuses with the refrigerant filled in the piping. This being the case, an air conditioning apparatus which requires no air purging work has not yet been put to practical use.

The inventors have developed a pipe connector which can prevent leak of refrigerant in the piping for a long time. As a result, the above-described pipe connector has been developed. If the pipe connector according to the present invention is used, the air conditioning apparatus can be consigned from the factory with a refrigerant filled in the piping. Therefore, the work for installing the household air conditioning apparatus can be simplified.

The piping work with use of the pipe connector of the present invention will now be described with reference to FIG. 8.

In general, when air conditioning apparatuses using the pipe connector of the present invention are consigned from the factory, the refrigerant such as Freon is filled in the indoor unit 45, connection pipes 46 and outdoor unit 47. Specifically, after the refrigerant has been filled in the connection pipes 46, a plug having the same shape as the plug P of the present invention is engaged and sealed in the piping-side socket S. The inner cylindrical member 40 is fixed to the main cylindrical member 1 by fastening the socket-(S)-side screw 14. In addition, the indoor unit 45 and outdoor unit 47, with the refrigerant filled, are connected to internal pipes 45a and 47a and the plug P is capped and sealed. Accordingly, the indoor unit 45, pipes 46 and outdoor unit 47 are filled with the refrigerant. This makes it unnecessary to perform an air purge work while connecting the indoor unit 45, pipes 46 and outdoor unit 47.

The indoor unit 45, pipes 46 and outdoor unit 47 consigned in the above state are disposed, as shown in FIG. 8. Then, the plug-(P)-side cap and the socket-(S)-side cap are removed, and the indoor unit-side plug P is connected to the pipe-side socket S and the outdoor unit-side plug P to the pipe-side socket S. Thereby, the air conditioning apparatus can easily be set in an operable state without performing a special air purge work. After the plug P and socket S of the pipe connector are coupled, the screw 13 is fastened to move the cam 12, as has been described above in detail in connection with the pipe connector. The sealing state is maintained by the end portion of the plug and the sealing member 5a as well as by the metallic seal 5b.

By using the pipe connector according to the present invention, the conventionally required air purging work is dispensed with or simplified. Anyone can easily install the air conditioning apparatus with no professional skill or knowledge.

The above-described embodiment is only one of embodiments of the present invention. The pipe connector of this invention is applicable not only to the air conditioning apparatuses but also to various parts requiring tight sealing for a long time. The number of pairs of plugs and sockets of the connector is not limited to two, and the number may be changed on an as-needed basis. In the above embodiment, the valve mechanism is provided in each of the socket and plug. Needless to say, however, one or both of the valve mechanisms of the socket and plug may be removed.

The present invention may be variously modified without departing from the spirit or main features of the invention. The above embodiment has been described merely by way of example, and the invention is not limited to this embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A pipe connector for making a plurality of first pipes communicate with a plurality of second pipes so that a fluid may flow through the first pipes and the second pipes, comprising:

a plurality of sockets each connected to an associated one of the first pipes;

a plurality of plugs each connected to an associated one of the second pipes, having an internal hole communicating with said associated one of the second pipes, and having a hollow plug body in which an associated one of the sockets is detachably engaged; and a locking mechanism, provided on each of the sockets, for locking the plug body engaged in the associated socket and preventing the plug body from being disengaged in the axial direction thereof, comprising each of said sockets comprising a first end portion connected to the associated first pipe, a second end portion in which the plug body of the associated plug is detachably attached, and a rear cylindrical member having an internal hole communicating with the associated first pipe, each of said sockets further comprises an inner cylindrical member having a plurality of housing sections with substantially parallel axes for housing said rear cylindrical member, and a coupling portion for coupling said housing sections; and a main cylindrical member, extending in the axial direction of said housing sections, for movably containing said housing sections, said coupling portion and said main cylindrical member have a pair of holes formed to correspond to each other, one of said pair of holes having a tapered surface inclined with respect to said axial direction, each of said sockets has a cam member contained in the other of said pair of holes, and when the plug body is locked to the associated socket by means of said locking mechanism, said cam member is externally driven to cooperate with said tapered surface, thereby moving the main cylindrical member and the inner cylindrical member relative to each other in the axial direction of the housing sections and bringing said plug body and said rear cylindrical member into contact with each other in the axial direction thereof.

2. The pipe connector according to claim 1, wherein said locking mechanism includes a ball holding cylindrical member slidably mounted on the second end portion of the rear cylindrical member, a plurality of locking balls disposed on the ball holding cylindrical member at intervals in the circumferential direction of the ball holding cylindrical member, and a front cylindrical member provided in said main cylindrical member and disposed on the outer peripheral side of the ball holding cylindrical member, said front cylindrical member having an inclined surface for situating the locking balls in an unlocked position in which the locking balls can move radially outward, when the ball holding cylindrical member is retreated toward the rear cylindrical member, and for situating the locking balls in a locked position in which the locking balls project radially outward from the inner peripheral surface of the ball holding cylindrical member, when the ball holding cylindrical member is partially projected from the rear cylindrical member, said plug body has an outer peripheral groove for receiving the locking balls situated in the locked position, and axial movement of the ball holding cylindrical member is prevented by the locking balls held between the inclined surface and the outer peripheral groove when the cam member has brought the rear cylindrical member into contact with the plug body.

3. The pipe connector according to claim 1, wherein said sockets and plugs have valve mechanisms for sealing their inner holes from the outside, and the valve mechanisms are opened to communicate with each other when the cam member has brought the rear cylindrical member into contact with the plug body.

4. The pipe connector according to claim 1, wherein said rear cylindrical member has an end portion with an increased inside diameter for receiving a distal end portion of the plug body, and a metallic seal provided in the end portion for effecting hermetical sealing between the end portion and the distal end portion of the plug body.

5. The pipe connector according to claim 1, further comprising a coupling plate for disposing the plug bodies of the plugs coaxial with the rear cylindrical members contained in the housing sections of the inner cylindrical members and integrally coupling the plug bodies.

6. The pipe connector according to claim 3, wherein said valve mechanism of the socket comprises a slide ring disposed slidable in the rear cylindrical member and urged toward the second portion, a sealing member disposed on the slide ring in the vicinity of said second end portion, and a valve rod fixed to the rear cylindrical member and engaged with the slide ring with the sealing member interposed, said valve mechanism of the plug includes a valve body slidably disposed in the plug body and urged toward the distal end portion, and a valve seat for engaging said valve body against an urging force, and when the cam member has moved the main cylindrical member and the inner cylindrical member relative to each other in the axial direction of said housing sections, the plug body engages the slide ring and the valve rod moves the valve body, thereby making said two internal holes communicate with each other.

7. The pipe connector according to claim 1, wherein said cam member is moved by means of a screw in a direction substantially perpendicular to a plane in which the axis of each of the housing sections.

8. The pipe connector according to claim 1, further comprising locking means for preventing relative movement of the main cylindrical member and the inner cylindrical member when said rear cylindrical member has come into contact with the plug body.

9. The pipe connector according to claim 1, wherein the number of said sockets is two and the number of said plugs is two.

10. Pipes connecting two fluid devices, said pipes comprising a set of two pipes having female units at both ends, the female units being detachably connected to plugs of male units attached to end portions of the two fluid devices to be connected, so that a fluid may flow through said pipes and said other pipes in each of said fluid devices, each of female units comprising:

sockets to be connected to the plugs, each of said sockets including:

a locking mechanism for locking a plug body of the associated plug engaged in the socket, thereby preventing the plug from axially moving and being disengaged from the socket, a rear cylindrical member having a first end portion to be coupled to the associated one of said pipes, a second end portion to be detachably coupled to the associated plug, and an inner hole for communication of fluid with the associated pipe, an inner cylindrical member for housing said rear cylindrical members, and a main cylindrical member, for movably containing said inner cylindrical members sections;

a coupling portion for integrally connecting the inner cylindrical members to each other, said coupling portion and said main cylindrical member having a pair of holes formed to correspond to each other, one of said pair of holes having a tapered surface inclined with respect to said axial direction; and a cam member contained in the other of said pair of holes, wherein when the plug is locked to the associated socket by means of said locking mechanism, said cam member is externally driven to cooperate with said tapered surface, thereby moving the main cylindrical member and the inner cylindrical member relative to each other in the axial direction of the housing sections and bringing said plug body and said rear cylindrical member into contact with each other in the axial direction thereof.

* * * * *